United States Patent [19]

Maupin

[11] Patent Number: 4,944,535
[45] Date of Patent: Jul. 31, 1990

[54] ROTARY LIQUID CONNECTION MECHANISM

[76] Inventor: Lorne D. Maupin, 341 Wagner Dr., Claremont, Calif. 91711

[21] Appl. No.: 260,496

[22] Filed: Oct. 21, 1988

[51] Int. Cl.$^5$ .............................................. F16L 55/00
[52] U.S. Cl. ....................................... 285/16; 285/281
[58] Field of Search ........................... 285/275, 281, 16

[56] References Cited

U.S. PATENT DOCUMENTS

| | | |
|---|---|---|
| 822,272 | 6/1906 | Hall ..................................... 285/281 |
| 1,703,823 | 2/1929 | Johansen ......................... 285/275 X |
| 1,737,465 | 11/1929 | Lindsey ........................... 285/281 X |
| 1,797,382 | 3/1931 | Wade et al. ...................... 285/275 X |
| 1,831,956 | 11/1931 | Harrington ....................... 285/275 X |
| 3,058,761 | 10/1962 | Christophersen .................... 285/281 |

*Primary Examiner*—Dave W. Arola
*Attorney, Agent, or Firm*—Boniard I. Brown

[57] ABSTRACT

A liquid flow tube extends through an anti-friction bearing so that the tube can rotate around its axis while liquid is flowing through the tube interior space. A dynamic seal is arranged between the outer cylindrical surface of the tube and a stationary sleeve structure. Preferred sealing material is rope-like packing helically wound within an annular recess in the sleeve structure; an annular piston extends into the recess to apply force onto the packing for preventing any leakage across the packing interfaces (at the sleeve or tube surfaces).

15 Claims, 1 Drawing Sheet

ROTARY LIQUID CONNECTION MECHANISM

BACKGROUND OF THE INVENTION

This invention relates to a rotary joint between a stationary sleeve and a rotary liquid conduit. The conduit may, for example, be part of (or contained within) a rotating roll used in paper mills to perform calendaring operations on paper stock; water circulated through the rolls maintains them at desired temperatures suitable for achieving uniform quality paper.

Rotary liquid conduit joints are already known. In one case a rotary liquid conduit was provided with an annular ceramic disc on its end surface. A mating disc, formed of carbon graphite material, was provided in the stationary housing that contained the bearings for the rotary conduit. One disadvantage of this arrangement is that the ceramic disc and graphite disc are located within the housing where it is difficult to gain access for repair or replacement purposes. Another disadvantage is that the sealing discs are non-adjustable. Once the disc system begins to leak the only corrective action that can be taken is to replace the disc assembly. Often a considerable time is involved in removing and replacing the bearing and seal components with resultant substantial costly down-time of production operations. A further disadvantage of the ceramic-graphite disc assembly is the cost; these disc assemblies are relatively costly. A still further disadvantage of the prior art arrangement is the fact that the seal assembly is in close proximity to the anti-friction bearings. Water leakage past the seals can corrode the bearings.

SUMMARY OF THE INVENTION

My invention is directed to a relatively low cost seal mechanism for a rotary conduit-stationary sleeve interface. The seal is formed as a packing gland having extensive surface area engagement along a substantial length of the stationary sleeve and rotary conduit, e.g. about one inch. An annular piston is adjustably arranged to engage an otherwise exposed end face of the packing, to apply axial pressure to the packing for compacting the packing material and thereby making it conform to the rotary conduit surface. Should a leak develop at the rotary joint the annular piston can be adjusted to apply a greater axial force on the packing, thereby in many cases stopping the leak.

The packing is preferably a flexible non-wettable fibrous rope-like material having some degree of resiliency and reshapeability, e.g. braided plastic rope. Installation of the plastic rope packing is accomplished by retracting the annular piston along the surface of the rotary conduit, winding the rope around the conduit surface several times (e.g. five or more turns), and advancing the piston against the packing to force it into an annular recess in the stationary sleeve, thereby enabling the packing to closely conform to the sleeve-conduit interface.

A major advantage of the described installation is the fact that the packing can be removed and installed without disassembling the rotary joint connection. All that is required is to retract the annular piston from its normal position extending into the annular recess. An important advantage is that the pressure on the packing may be adjusted or increased without disconnecting any components or stopping the rotary conduit, thereby eliminating any down time of productive operation.

DESCRIPTION OF A PREFERRED EMBODIMENT OF THE INVENTION

Figure 1:
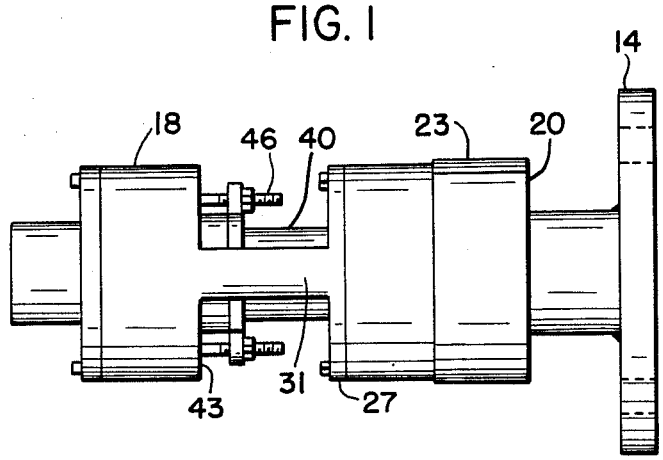
FIG. 1 is an elevational view of a sealing-bearing connection structure according to the invention.
Figure 3:
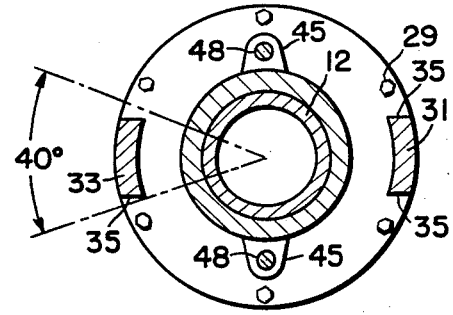
FIG. 3 is a sectional view on line 3—3 in FIG. 2.

FIG. 1 shows a mechanism that supports a rotary liquid conduit 8, while sealingly connecting the rotary conduit to a stationary liquid pipe. The mechanism includes an anti-friction bearing means for the conduit, and a separate sealing means for sealing the interface between the rotary conduit and a stationary liquid pipe structure. The liquid can flow from the rotary conduit into the stationary pipe structure, or it can flow from the stationary pipe into the rotary conduit.

The rotary conduit 8 can comprise two tubes 10 and 12 suitably connected together in axially-aligned relation. Tube 10 has a radial flange 14 for attaching the conduit to a liquid-containing roll used to perform calendaring operations on paper stock. The left end of tube 10 has a counterbore machined therein to receive the end portion of tube 12; the tubes are welded together at 16. Tube 12 extends leftwardly into a stationary sleeve structure 18 containing a sealing mechanism for the sleeve-conduit interface.

An anti-friction bearing means 20 is provided to rotatably support conduit 8 for rotation around its longitudinal axis 21. The bearing means comprises a stationary housing structure 23 designed to mount anti-friction ball bearings 24 and 25 therein. An end plate 27 is detachably secured to housing structure 23 via bolts 29.

The stationary sleeve structure 18 is attached to end plate 27 via two straight axial bars 31 and 33. Welds 35 and 37 serve as rigid attachments between the bars and components 18 and 27, such that structure 18 is rigidly attached to housing structure 23 while being axially spaced therefrom. The axial spacing provides a free clearance area that enables a maintenance person to gain easy access to the conduit sealing means located within sleeve structure 18.

Sleeve structure 18 has a cylindrical internal surface 38 slidably fitting on the outer cylindrical surface 40 of liquid conduit 8, i.e. tube 12. An annular cylindrical recess 41 is formed in sleeve surface 38 from end face 43 of the sleeve structure to a point near the left end of tube 12. Recess 41 accommodates a sealant packing 44.

Figure 2:
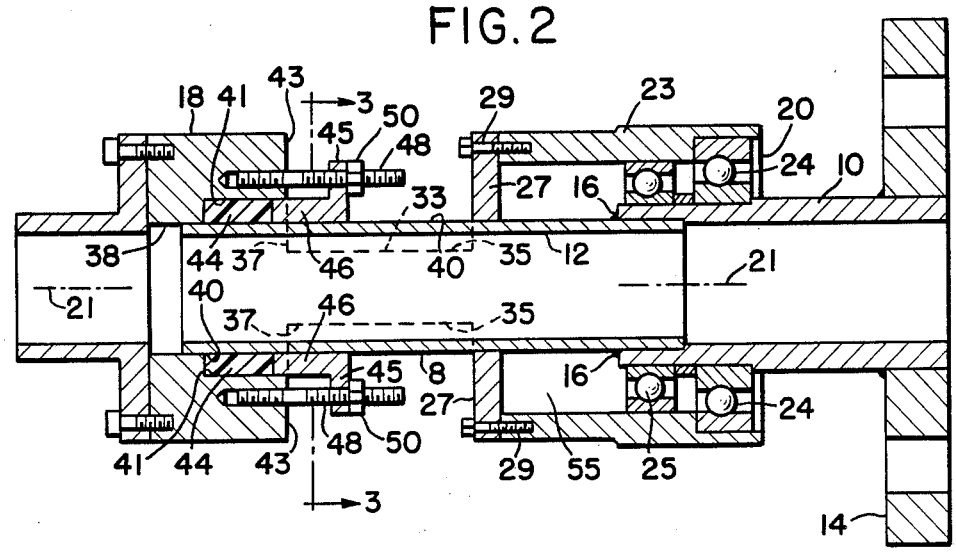
FIG. 2 is a sectional view taken through a sealing-bearing connection structure embodying my invention.

Packing 44 is retained within recess 41 by an annular piston 46 that has its inner and outer surfaces slidably engaged with the cylindrical surfaces on tube 12 and sleeve structure 18. Two diammetrically-spaced studs 48 project axially from end face 43 of sleeve structure 18 through clearance holes in piston flange means 45. As shown in FIG. 2, flange means 45 takes the form of ears. The flange means could be a continuous annular flange extending around the piston circumference. However, the use of diammetrically-spaced ears is preferred because the ears form visual locator points that are useful for aligning the flange holes with studs 48 (when the piston is being moved leftwardly from a detached position to the right of studs 48). Nuts 50 are threaded onto studs 48 to thus connect piston 46 to sleeve structure 18.

The axial space between sleeve end face 43 and end plate 27 is relatively unobstructed, whereby a wrench can be applied to nuts 50 to advance the nuts along studs 48, either to the left or to the right. Leftward movement of the nuts forces annular piston 46 to apply an increased pressure on packing 44, to thereby enhance the sealing action, e.g. should there be visual evidence of a leak at end face 43. The wrench can be applied to nuts 50 while conduit 8 is rotating. The conduit does not have to be stopped or disconnected.

It will be noted from FIG. 2 that bars 31 and 33 are diammetrically spaced relative to rotational axis 21. The bars have cirucmferential dimensions measuring about forty degrees, leaving two clearance spaces each measuring about one hundred forty degrees for insertion of a wrench onto nuts 50. Studs 48 are located midway between bars 31 and 33 (in a circumferential sense), such that the wrench can be turned a considerable distance around the stud axis before striking either one of the bars. Bars 31 and 33 form bridging connections between sealing sleeve 18 and bearing means 20, while at the same time being discontinuous in the circumferential direction so as to form access spaces for manual access to nuts 50.

Packing 44 is preferably an elongated braided rope material having a cross-sectional diameter substantially the same as the annular depth of recess 41. The elongated rope has a length equal to five or more turns around the circumference of tube 12. The packing can be initially inserted into recess 41 by first removing nuts 50 from studs 48 and manually retracting piston 46 to the right so that its right face is at or near end plate 27. The packing rope is wound tightly around the outer surface of tube 12, after which piston 46 is moved leftwardly so that the left end of the piston pushes the wound rope into recess 41. Nuts 50 are tightened on studs 48 to enable piston 46 to apply the necessary axial force on the packing material.

The drawings show the manual force-applying means as two studs 48 and two associated nuts 50. However, as an alternative two bolts could be used. In that case, two taped holes could be formed in end face 43 of sleeve structure 18. The bolts could be extended through the clearance holes in ears 45 into the taped holes, with the bolt heads being located in the positions occupied by nuts 50. In some respects the use of bolts might be preferred, in that the bolts could be removed to make the surface of tube 12 completely accessible for winding the rope packing therearound.

It will be noted that the sealing mechanism within sleeve 18 is spaced axially from the anti-friction bearings 24 and 25. This is advantageous in that any liquid leaking out at sleeve end face 43 is not likely to migrate into contact with bearing units 24 and 25. This minimizes the danger of corrosion and makes the use of special seals for the bearings less critical.

Housing structure 23 and the anti-friction bearing units 24 and 25 are pre-existing structures that have previously been used in conjunction with discarded face seals (not shown). As shown in FIG. 1, end plate 27 is spaced to the left of anti-friction bearing 25, leaving a vacant zone at 55. This vacant zone was previously used to mount two face seals formed by two face-engaged ceramic and graphite disc members (not shown). My invention can be practiced by removing the face seals, and attaching a new elongated tube 12 to the existing tube 10; After tube 12 has been welded to tube 10 a new end plate 27 is provided for connecting the new sealing structure 18 to the existing bearing mechanism.

Plate 27 is welded to bridging bars 31 and 33, the bars being welded to sleeve structure 18. Plate 27 and the connected sleeve structure 18 are therefore an integral unitary sub-assembly that can be added to the pre-existing anti-friction bearing mechanism as a retrofit operation. The sealing mechanism sub-assembly can be removed as a unit if necessary. However, as previously noted, the packing 44 can be replaced without disconnecting sleeve structure 18 from the bearing mechanism.

A primary feature of my invention is the capability for adjusting piston 46 to increase or vary the pressure on packing 44 without disconnecting any components or stopping the rotary conduit, thus eliminating downtime of productive operation and resultant costs. A further feature is the ability to change the packing without disassembling any housing components (although conduit 8 must of course be in a stopped condition). The capability of adjusting the pressure on the packing, and the ability to change the packing without disassembling of components, eliminates any significant down time of productive operation of the system in which the rotary conduit is utilized, and eliminates related problems in associated systems. For example, in paper calendaring operations, the failure of a prior art mechanical seal joint typically results in continuing operation of the overall system for a number of days, despite the failure of one mechanical joint, thereby resulting in serious damaging or the ruining of other mechanical joints, typically eight, in such systems, all requiring substantial down time and expense to repair.

Thus there has been shown and described a novel rotary liquid connection mechanism which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A rotary liquid conduit mechanism comprising:
    a stationary annular housing structure,
    a rotatable fluid conduit extending axially through the housing structure,
    bearing means in the housing structure and rotatably supporting the conduit against radial movement relative to said housing structure,
    a stationary sleeve structure spaced axially from the housing structure and encircling the conduit,
    bridge means extending between the housing structure and the sleeve structure,
    said bridge means defining at least one opening for manual access therethrough,
    said sleeve structure having an annular packing in a recess therein and disposed about the rotatable fluid conduit,
    an annular piston slidable on the rotatable conduit and extensible into the recess to engage the packing, and
    means for urging the piston against the packing in the recess to apply axial force to compress the packing.

2. The mechanism of claim 1, wherein the means for urging the piston comprises radial flange means on the piston and having a plurality of axial holes therethrough, and threaded adjustment means extending through the axial holes into the end face of the stationary sleeve, whereby axial forces are applied to the radial flange means to draw the piston axially toward the stationary sleeve.

3. The mechanism of claim 1, wherein the bridge means comprises two axially-extending bars radially outward of the annular piston, said bars being diametrically spaced relative to the rotational axis of the liquid conduit.

4. A rotary conduit mechanism according to claim 1, wherein:
   said bridge means comprises at least one axially extending bar.

5. A rotary conduit mechanism according to claim 1, wherein said means for urging the piston comprises:
   a radial flange portion of the piston, and
   threaded means extending through the flange means and into said sleeve structure.

6. The improvement of claim 5, wherein the annular piston is retractible from the recess to permit the packing to be replaced.

7. A rotary conduit mechanism according to claim 5, wherein:
   the threaded means comprises at least two threaded studs extending from the sleeve structure and through openings in the radial flange portion of the piston, and further including at least two nuts threadedly engaging the studs for application of axial force on the radial flange portion.

8. The mechanism of claim 5, wherein the clearance space between said stationary housing structure and said stationary sleeve is of sufficient axial dimension as to permit the annular piston to be withdrawn completely from the annular recess.

9. The mechanism of claim 8, wherein the packing is an elongated flexible rope-like element that can be wrapped several times around the outer cylindrical surface of the liquid conduit when the annular piston is withdrawn from the annular recess, after which the piston can be moved axially to force the wound packing into the recess.

10. The mechanism of claim 1, wherein the clearance space between said stationary housing structure and said stationary sleeve is of sufficient axial dimension as to permit the annular piston to be withdrawn completely from the annular recess.

11. A rotary conduit mechanism according to claim 1, wherein:
    the bearing means comprises radial roller bearing means.

12. A rotary conduit mechanism according to claim 1, wherein:
    the rotatable liquid conduit comprises a first tube extending axially to the position of the bearing means, and
    a second tube extending axially from the first tube to the axial position of the stationary sleeve structure.

13. The mechanism of claim 12, wherein the second tube has an end portion thereof extending into the first tube, said tubes being connected together by a weld at the end of the first tube.

14. A rotary conduit mechanism according to claim 11, and further including:
    means on an end portion of the conduit for attachment of the conduit to a rotary driving means.

15. A rotary conduit mechanism according to claim 14, wherein said means on an end portion of the conduit comprises a radial flange for attachment to the driving means.

* * * * *